F. T. GRIMES.
Baster for Sewing Machines.
No. 109,612.                                            Patented Nov. 29, 1870.
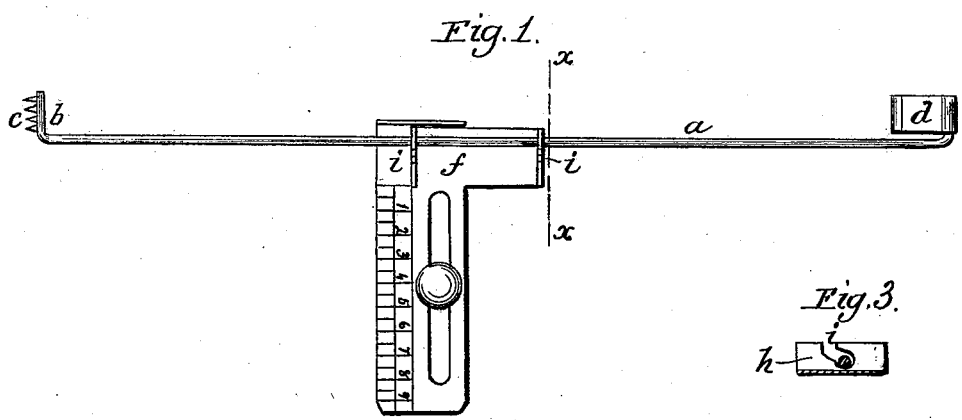
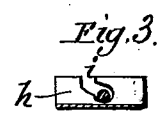
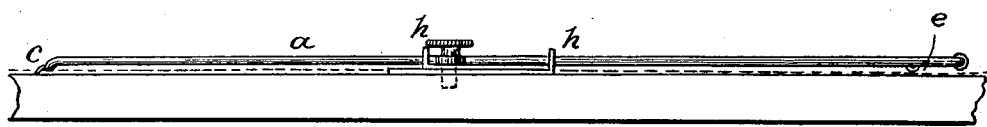

UNITED STATES PATENT OFFICE.

FRANKLIN THOMAS GRIMES, OF LIBERTY, MISSOURI.

IMPROVEMENT IN ATTACHMENTS FOR SEWING-MACHINES.

Specification forming part of Letters Patent No. 109,612, dated November 29, 1870.

*To all whom it may concern:*

Be it known that I, FRANKLIN T. GRIMES, of Liberty, in the county of Clay and State of Missouri, have invented a new and Improved Attachable and Detachable Baster for Sewing-Machines; and I do hereby declare that the following is a full, clear, and exact description of the same, reference being had to the accompanying drawing, forming a part of this specification, in which—

Figure 1 is a plan view. Fig. 2 is a side elevation, and Fig. 3 a transverse vertical section in the line $x$ $x$, Fig. 1.

This invention consists of a rod to be attached by any convenient means to the cloth-table of a sewing-machine, or to an adjustable plate connected with the cloth-table, said rod being provided with arms at its ends, one of which arms is furnished with teeth, while to the other is fastened one extremity of an elastic strip, that is also furnished with teeth at its other extremity, which teeth are fastened into the fabrics to be sewed together, and into these fabrics, after being duly stretched, the teeth of the arm aforesaid are inserted, by which means the cloth is kept smoothly extended and prevented from drawing or puckering.

In the drawing, $a$ is the rod; $b$, one of its arms; $c$, the teeth of such arm; $d$, the elastic attached to the arm at the other end of the rod; $e$, the teeth of such strip; $f$, the adjustable plate; $h$ $h$, flanges projecting upward from such plate; $i$, orifices in the flanges $h$, which receive the rod $a$, and from which it may be removed at pleasure; $k$, shoulders in the orifices $i$, which hold the rod in place, permitting it to be moved endwise.

The arms of the rod $a$ project beyond the line of the needle and hold the cloth, while the rod itself is out of the way of the same.

Having thus described my invention, what I claim as new, and desire to secure by Letters Patent, is—

The rod $a$, provided at its ends with toothed arm $b$ and toothed elastic $d$, in combination with the guiding-plate $f$, as and for the purpose set forth.

To the above specification of my invention I have signed my hand this 5th day of May, 1870.

FRANKLIN T. GRIMES.

Witnesses:
CHAS. A. PETTIT,
SOLON C. KEMON.